United States Patent [19]

Qader

[11] 4,290,779

[45] Sep. 22, 1981

[54] SOLAR HEATED FLUIDIZED BED GASIFICATION SYSTEM

[76] Inventors: Robert A. Frosch, Administrator of the National Aeronautics and Space Administration, with respect to an invention of Shaik A. Qader, 704 Marlboro Ct., Claremont, Calif. 91711

[21] Appl. No.: 150,115

[22] Filed: May 15, 1980

[51] Int. Cl.³ .............................................. C10B 1/00
[52] U.S. Cl. .......................................... 48/89; 48/99; 126/438; 250/527
[58] Field of Search ............... 250/527; 126/430, 438, 126/439, 440, 451; 48/62 R, 63, 99, 89, 111; 202/234, 108; 203/DIG. 1, DIG. 16; 201/31

[56] References Cited

U.S. PATENT DOCUMENTS

| | | | |
|---|---|---|---|
| 549,765 | 11/1895 | Calver | 126/457 |
| 3,993,458 | 11/1976 | Antal, Jr. | 48/111 |
| 4,055,948 | 11/1977 | Kraus et al. | 126/438 |
| 4,114,685 | 9/1978 | Schwartz et al. | 126/440 |
| 4,121,564 | 10/1978 | Schwartz | 126/438 |

Primary Examiner—S. Leon Bashore
Assistant Examiner—Michael L. Goldman
Attorney, Agent, or Firm—Monte F. Mott; John R. Manning; Paul F. McCaul

[57] ABSTRACT

A solar-powered fluidized bed gasification system for gasifying carbonaceous material. The system includes a solar gasifier (10) which is heated by fluidizing gas and steam. Energy to heat the gas and steam is supplied by a high heat capacity refractory honeycomb (16) which surrounds the fluid bed reactor zone (14). The high heat capacity refractory honeycomb (16) is heated by solar energy focused on the honeycomb (16) by solar concentrator (32) through solar window (20). The fluid bed reaction zone (14) is also heated directly and uniformly by thermal contact of the high heat capacity ceramic honeycomb (16) with the walls of the fluidized bed reactor (12).

Provisions are also made for recovering and recycling catalysts used in the gasification process. Back-up furnace (50) is provided for start-up procedures and for supplying heat to the fluid bed reaction zone (14) when adequate supplies of solar energy are not available.

7 Claims, 1 Drawing Figure

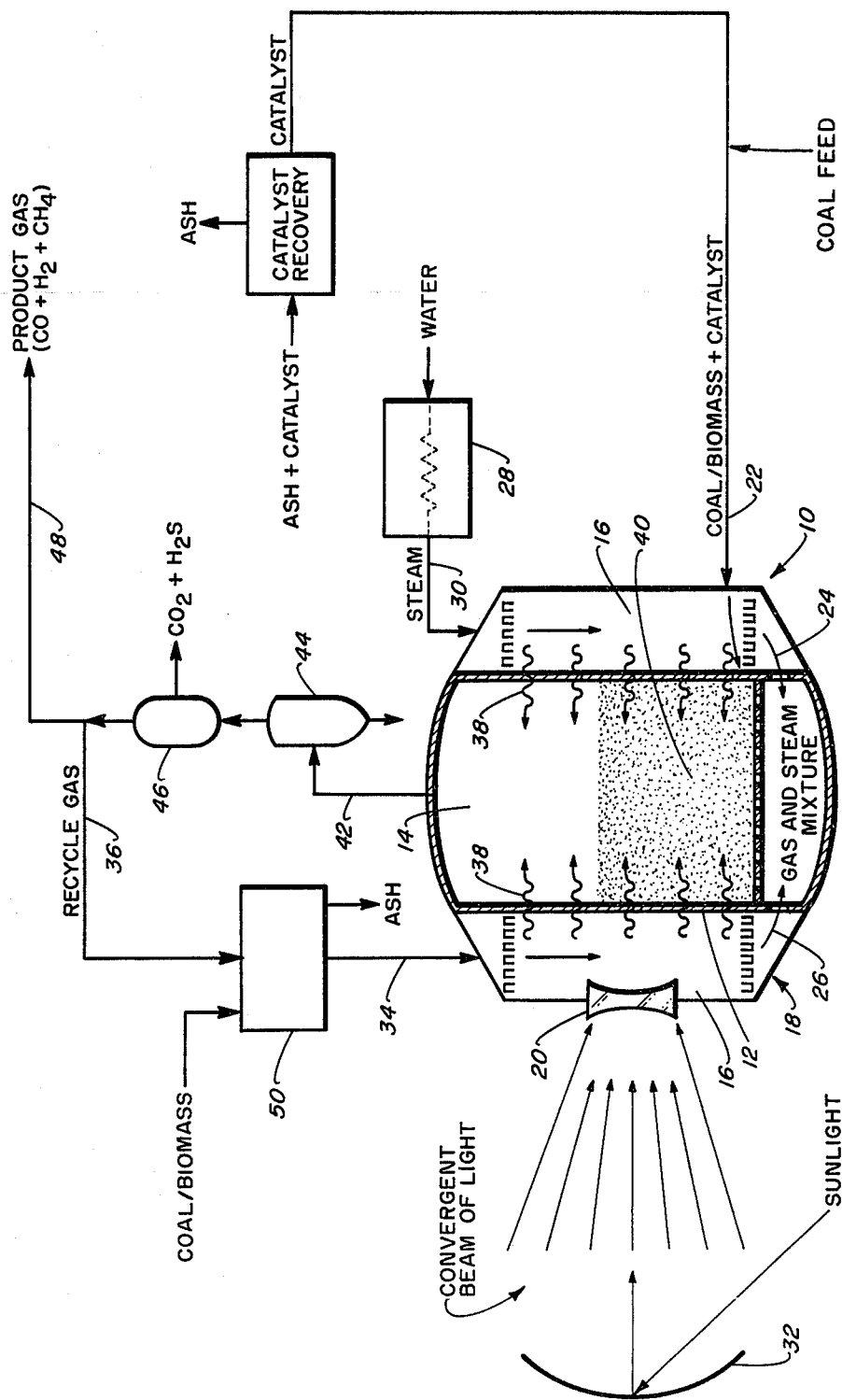

SOLAR HEATED FLUIDIZED BED GASIFICATION SYSTEM

ORIGIN OF THE INVENTION

The invention described herein was made in the performance of work under a NASA contract and is subject to the provisions of Section 305 of the National Aeronautics and Space Act of 1958, Public Law 83-568 (72-Stat. 435; 42 USC 2454).

BACKGROUND OF THE INVENTION

Coal gasification is a well known process for the conversion of coal solids into gaseous fuel. In the prior art, a fluidized bed reaction of carbon with water and some oxygen forms a mixture of methane, carbon monoxide and hydrogen. This mixture, called synthesis gas, is an easily transported fuel.

The process is known to be highly endothermic, requiring continuous massive inputs of heat to sustain a reaction. In a full-scale plant based on coal-oxygen-steam gasification, usually at least 30 wt. % of the coal is consumed in supplying needed process input heat and steam, and hence only about 70 wt. % of the coal is effectively converted to useful commercial fuel. When one takes into account additional coal used for power generation at a typical plant, the net conversion of coal to commercial fuel can be as low as 50 to 60 wt. % overall. In addition considerable amounts of oxygen are consumed, typically about 0.5 ton of oxygen per ton of coal throughput.

Biomass solids are becoming increasingly available, and like coal are difficult to transport. The similar endothermic conversion of carbonaceous biomass solids in a fluidized bed with steam forming synthesis gas is currently being debated, but tends not to be attractive due to the massive energy inputs required, just to sustain the reaction.

It would be very desirable to be able to gasify these carbonaceous materials without consuming large amounts of oxygen and the carbonaceous materials themselves during heat generation for the process.

With this in mind, attempts have been made to utilize solar energy as the source of heat necessary to promote the gasification reaction. One such attempt is disclosed in U.S. Pat. No. 3,993,458 issued to Antal on Nov. 23, 1976. In this patent, solar energy is introduced directly into the gasification reactor through quartz windows.

There are many disadvantages inherent in introducing solar energy into a reactor in the fashion disclosed by Antal. Solar energy input is lessened due to blackening of the quartz input window by tar, coke and ash formation. Additionally, since the coal is not transparent, solar heating is limited to the small zone directly adjacent the solar window. This may result in overheating in areas adjacent the solar window and subsequent reactor damage.

It is therefore desirable to have a solar powered gasification system which introduces the solar energy into the gasification system in an efficient and effective manner.

SUMMARY OF THE INVENTION

A system for the fluidized gasification of a carbonaceous material such as coal has been provided in accordance with the invention which does not require the use of oxygen. The system operates at lower overall temperatures while providing nearly double the amount of full gas product. In the system of the invention a portion of the product gas is recycled to the bottom of the reactor and serves as the fluidizing media. Steam is also introduced into the bottom of the reactor and synthesis product gas is produced by means of the steam-carbon reaction preferably assisted by a catalyst such as an alkali metal carbonate or a molybdate such as cobalt molybdate.

The process and system of the invention provides substantially increased yield of product gas by the use of solar thermal heat to preheat the recycle product fluidizing gas and the steam before entry into the fluidized bed reaction zone. Though a black body is theoretically an efficient means to heat the reactor walls, the extremely high temperatures achievable by solar concentrators would cause local overheating and weakening of the walls of the pressurized reactor vessel. Therefore, the preheating of the recycle product fluidizing gas and steam is conducted in accordance with this invention in a solar heat absorption zone constructed of an open cell high heat capacity refractory material housed in an insulating shell containing a plurality of windows transparent to solar energy such as fused silica. Even high efficiencies are achieved by forming the preheater as an annular member surrounding the reactor vessel since solar thermal energy will be conducted to the reactor vessel and fluidized bed and the honeycomb shell.

The present invention ovecomes problems inherent in the previously utilized solar gasification apparatus by utilizing a solar heat absorption zone to efficiently and effectively provide the heat necessary to carry out gasification of coal, biomass solids and other carbonaceous materials.

The solar gasification apparatus of the present invention operates on the same general principles as the well known prior art gasification systems. A reactor defining a reaction zone is provided with means for introducing fluidizing gas, steam and carbonaceous material into the reaction zone to carry out the gasification. Means are also provided for removing the fuel gas product from the reaction zone.

The fluidizing gas and steam are both preheated by being passed through the solar heat absorption zone prior to their entry into the gasification reaction zone. The heat transferred to the fluidizing gas and steam as they pass through the solar heat absorption zone is conveyed by the fluidizing gas and steam into the reaction zone to supply the heat necessary for gasification.

This method of introducing heat into the reaction zone by way of fluidizing gas and steam advantageously avoids the problems caused by blackening of the solar input window and also overcomes the problem of zone overheating adjacent the solar input window by introducing a stream of heated gases which uniformly distribute heat throughout the reaction zone. Both problems, as previously mentioned, are common in other solar powered gasification systems.

These and many other features and attendant advantages of the present invention will become apparent as the invention becomes better understood by reference to the following detailed description when considered in conjunction with the accompanying drawing.

BRIEF DESCRIPTION OF THE DRAWING

The FIGURE is a diagrammatic representation of the preferred embodiment of the present invention.

DETAILED DESCRIPTION OF THE PREFERRED EMBODIMENT

The present invention discloses the use of a novel solar powered fluid bed gasifier for use in gasifying coal, biomass solids and other carbonaceous materials. The FIGURE is a diagrammatic representation of the preferred gasification system in which this novel solar powered fluid bed gasifier is utilized.

The solar gasifier is shown generally at 10 in the FIGURE. The solar gasifier basically comprises a conventional fluidized bed reactor 12 which defines a fluidized bed reaction zone 14; a high heat capacity refractory honeycomb shell 16 surrounding the fluid bed reactor 12; and an insulating gasifier shell 18 which includes a solar window 20 for introducing high intensity solar radiation into the refractory honeycomb shell 16 for heating.

Coal is introduced into the fluid bed reaction zone 14 as indicated by arrow 22. The coal is powdered or pelleted to enhance fluidization within the reaction zone 14. It is preferred that the coal be first impregnated with a gasification catalyst, such as potassium carbonate. The potassium carbonate catalyzes the gasification reaction and also removes some of the hydrogen sulfide produced during gasification. The use of such a gasification catalyst lowers the reaction temperature needed to achieve a given rate of reaction. This allows gasification within the fluidized bed reactor 12 to be carried out typically at temperatures between 1300° F. (704° C.) and 1500° F. (815° C.) as opposed to temperatures near 2000° F. (1093° C.) for many conventional gasifiers. In addition, use of potassium carbonate renders the coals non-agglomerating during prior processing and introduction into the reaction zone. Other suitable gasification catalysts include sodium carbonate and calcium hydroxide.

Although coal is probably the more common material to be used in the solar gasifier of the present invention, any dry, powdered carbonaceous feedstock may be substituted for the coal. This would include all the known and proposed organic biomass materials. The solar gasifier of the present invention is particularly attractive for dried wood in fluidizable form so long as the water content is below about 3 to 4 percent by weight. The fluidized bed reactor 12, as with most conventional fluidized reactors, readily accommodates solid pellets of any density and hence compacted biomass materials from conventional grinding and pelleting operations can readily be utilized. The biomass solids are also suitably impregnated with the potassium carbonate or other gasification catalysts to enhance the gasification reaction, as discussed above for coal.

The coal or biomass which is introduced into the reaction zone 14 undergoes gasification according to conventional gasification processes. Gasification is based on the endothermic reaction of carbon with water to produce methane and other combustible gases including carbon monoxide and hydrogen. The water is introduced into the reaction zone in the form of superheated steam as indicated by arrow 24. In addition, a sufficient amount of inert gas must be introduced into the reaction zone 14 to fluidize the carbonaceous material/steam mixture. Introduction of this fluidizing gas into the reaction zone is indicated by arrow 26. The fluidizing gas and steam mix as they enter the reactor to form a fluidizing gas and steam mixture. The may also be mixed outside the reactor and introduced as a single hot fluidizing gas/steam mixture.

The heat required for the endothermic gasification reaction within the reaction zone 14 is supplied by the sensible heat of the gas introduced at 26 and the superheated steam introduced at 24. Preferably the fluidizing gas and steam mixture are heated to a temperature of about 1500° F. (815° C.) to 2000° F. (1093° C.) before they are passed into the reaction zone 14 to fluidize and gasify the powdered or pelleted carbonaceous material.

The high heat capacity refractory honeycomb shell 16 is the novel solar heat absorption zone by which the present invention heats the fluidizing gas and steam to the desired temperatures for gasification. Water is initially introduced into a steam generator 28 where steam is formed. The steam passes via conduit 30 into the refractory honeycomb shell 16. The refractory honeycomb shell 16 is maintained at the desired temperature (1500° F. (815° C.) to 2000° F. (1093° C.)) by the introduction of high intensity solar radiation from solar concentrator 32 through solar window 20 into the high heat capacity refractory honeycomb shell 16. As the steam passes through the honeycomb structure, it is heated to the desired temperature.

Accordingly, the fluidizing gas is also introduced into the refractory honeycomb shell 16 through conduit 34. Likewise, as the fluidizing gas passes through the heated refractory honeycomb shell 16, it is also heated to the desired temperature. As particularly contemplated by the present invention, the fluidizing gas includes recycled gas. The recycled gas is simply a portion of the product gas which is removed via conduit 36 for reintroduction into the reaction zone 14 as the fluidizing gas. By recycling a portion of the hot product or fuel gas back into the reaction zone 14 as the fluidizing gas, heat is conserved and a convenient source of fluidizing gas is utilized.

The introduction of the fluidizing gas and steam at elevated temperatures into the reaction zone 14 provides the major portion of heat for the gasification reaction. However, it is preferred that the high heat capacity refractory honeycomb shell 16 surround the fluidized bed reactor 12 and come in direct contact with the reactor 12. This allows the direct transfer of heat as indicated by arrows 38 into the fluid bed reaction zone 14. This increases the heat transfer and efficiency of the refractory honeycomb shell 16.

The fluidizing gas and steam mixture are introduced along with the carbonaceous material into the reaction zone at sufficient velocities to form a fluidized bed as depicted at 40. Gaseous fuel or product gas along with any ash formed is removed from the reaction zone 14 via conduit 42. A cyclone separator 44 is provided to separate the ash which also contains significant amounts of catalyst from the gaseous fuel or product gas. The ash and catalyst are transferred to a catalyst recovery zone where a typical water extraction procedure serves to separate the very soluble carbonates or lime-type catalysts from the ash. The catalyst is then reused to impregnate additional carbonaceous material. The product gas, which is free of any ash or catalyst, is then transferred to a scrubber 46. The scrubber removes undesirable gases such as carbon dioxide and formed hydrogen sulfide. Typically the scrubber is charged with potassium carbonate solution held under pressure at about 300° C. (508° F.).

The scrubbed product gas leaves the scrubber 46 at about 300° C. (508° F.) and is immediately available for consumer use or transferred to product pipelines via conduit 48. As previously noted, a small portion of the product gas is removed from conduit 48 via recycle conduit 36 for introduction back into the solar gasifier 10 as the fluidizing gas.

A secondary reactor, such as backup furnace 50 is provided for heating the recycle gas when solar radiation is unavailable or during startup operations. Carbonaceous material such as coal or biomass is introduced into the furnace 50 along with oxygen to provide the heat necessary for heating the recycle gas. If desired, a portion of the recycle gas may also be combusted to provide the required heat.

As will be noted, the preferred embodiment of the present invention does not utilize oxygen in the reaction zone 14 to burn carbonaceous material to supply the heat necessary for gasification. This removes the need for the considerable amounts of oxygen required by conventional gasification procedures, typically about 0.5 ton of oxygen per ton of coal throughput. The present process thus is advantageous in eliminating the expensive oxygen required in conventional systems. At the same time, however, these factors make necessary a somewhat different startup procedure from conventional gasification systems. Because oxygen is no longer available to bring the carbonaceous material up to the desired reactive temperature where spontaneous reaction occurs between the carbon and water, it becomes necessary to preheat the fluidizing gas during startup operations.

The backup furnace 50 is provided to assist in preheating of the fluidizing gas stream. During startup, a cylinder or other source of product gas is connected to the backup furnace 50. The solar concentrator 32 is engaged and the circulation of gas through the backup furnace, onto the refractory honeycomb 16 and then into the reaction zone 14 is continued until the fluidizing gas reaches the desired temperature of about between 1500° F. (815° F.) and 2000° F. (1093° C.). At this point, the steam circulation is connected and the reaction between the carbonaceous material and steam begins to occur. A steady temperature state is maintained by adjusting the fluidizing gas flow rates and by varying the intensity of the solar input heating. The backup furnace 50 may then be shut down.

The solar concentrator 32 can be of any type having a thermal power output of at least 5 to 10 kilowatts. The solar concentrator 32 can be of the parabolic or other high temperature-output concentrator type. Sunlight from the solar concentrator 32 is shown focused through solar window 20 onto the refractory honeycomb 16. Preferably the window is composed of fused silica. Although only one solar window is shown in FIG. 1, certainly a plurality of solar windows and solar concentrators would be advantageous in supplying additional heat.

The composition of the refractory honeycomb 16 is not critical as long as it has a high heat absorption capacity. Any suitable refractory material may be used which can withstand the high temperatures (3000° F. (1648° C.) to 4000° F. (2204° C.)) generated by solar collectors. Preferred refractory materials include ceramics such as alumina, silicon carbide, silicon nitride and quartz. The exact thickness and configuration of the refractory honeycomb 16 or heat absorption zone may be varied to meet specific needs. Although in theory it might be possible to introduce solar radiation directly on the outer surface of the fluidized bed reactor 12, the projected high temperatures achieved by solar concentrators demand a refractory solar heat absorption zone to prevent local overheating and weakening of the walls of the fluidized bed reactor. Accordingly, the high heat capacity refractory honeycomb functions as a novel solar heat absorption zone which transfers solar heat directly and uniformly to the fluidized bed reactor 12 while at the same time serves to heat the fluidizing gas (recycle gas stream and steam) to the temperature desired for gasification of carbonaceous materials.

The actual temperatures and flow rates at which the the preferred gasification system is operated may be varied over a wide range with conditions of operation being dictated by principles well known in gasification technology.

This unique concept of utilizing a solar heat absorption zone to transfer heat is a vast improvement over prior art solar gasifiers which introduce high intensity solar radiation directly into the interior of the fluidized bed reactor.

Having thus described the preferred embodiment of the present invention, it should be noted by those skilled in the art that the within disclosures are exemplary only and that various other alternatives, adaptions and modifications may be made within the scope of the present invention. Accordingly, the present invention is not limited to the specific embodiments as illustrated herein.

What is claimed is:

1. A solar heated gasifier apparatus comprising:
a reactor defining a reaction zone;
means associated with a first end of said reactor for introducing a fluidizing gas into said reactor;
means for introducing a particulate material into said reactor where it is maintained in a fluidized state;
means for introducing gaseous reactant into said reactor where said gaseous reactant reacts with said material to form gaseous product;
an annular solar heat absorber positioned for directly and uniformly heating the reactor and including a gas permeable high heat capacity solid for heating said fluidizing gas and said gaseous reactant prior to the introduction of said fluidizing gas and said gaseous reactant into the reactor;
means for introducing solar heat into said solar heat absorber; and
means associated with a second end of said reactor for removing said gaseous product from the reactor.

2. The solar heated gasifier apparatus of claim 1 wherein said solar heat absorber includes a high heat capacity refractory honeycomb through which said fluidizing gas and said reactant are passed for heating prior to entry into the reaction zone.

3. The solar heated gasifier apparatus of claim 2 wherein said refractory honeycomb surrounds said reactor to directly heat said reactor.

4. The solar heated gasifier apparatus of claim 3 which further includes means for recycling a portion of said gaseous product as said fluidizing gas.

5. The solar heated gasifier of claim 3 which further includes an insulating shell surrounding said refractory honeycomb.

6. The solar heated gasifier of claim 5 wherein said means for introducing solar heat into said refractory honeycomb includes at least one solar window in said insulating shell.

7. The solar heated gasifier apparatus of claim 2 which further includes a secondary furnace for heating said fluidizing gas.

* * * * *